Feb. 28, 1967   V. ROSS   3,306,384
HYDRAULIC WEIGHER WITH STABILIZING RODS FOR USE ON TRUCK
Filed June 7, 1966
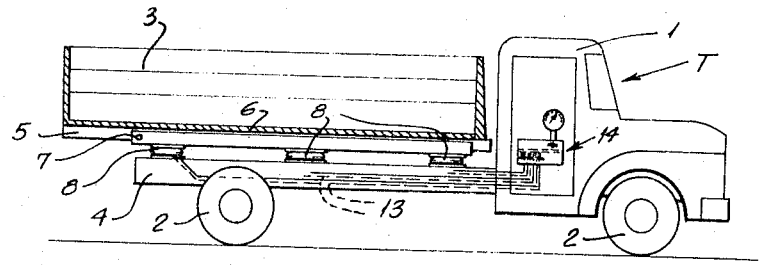
Fig. 1
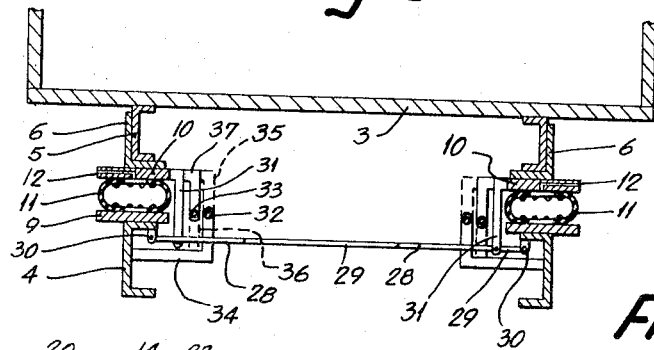
Fig. 2
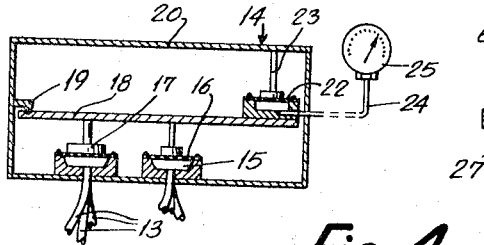
Fig. 3
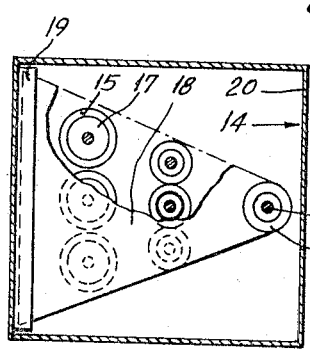
Fig. 4
Fig. 5
INVENTOR
Victor ROSS
By Pierre Lespérance
AGENT

United States Patent Office 3,306,384
Patented Feb. 28, 1967

3,306,384
HYDRAULIC WEIGHER WITH STABILIZING RODS FOR USE ON TRUCK
Victor Ross, 1849 14th Ave., Pointe-aux-Trembles, Quebec, Canada
Filed June 7, 1966, Ser. No. 555,849
6 Claims. (Cl. 177—141)

The present invention relates to motor vehicles and, more particularly, trucks adapted to carry a load, the weight of which is required to be known.

Trucks carrying gravel, earth and other materials in bulk are generally paid in proportion to the weight of the load and it is essential to know said weight. It also happens that the trucks are overloaded and resulting in breakdown of the mechanism or blowing of the tires.

To measure the weight of a truck load, there exist stationary weighing scales which weigh the complete truck and its load. These scales are very expensive to manufacture and to install and, therefore, it often happens, especially on temporary building sites, that such weighing scales are not provided, which results in unjust paying of the truck drivers and overloading of the trucks.

The general object of the present invention resides therefore in the provision of a weighing system which will obviate the above-mentioned disadvantages.

A more specific object of the present invention resides in the provision of a weighing system mounted on the truck itself, whereby each truck is provided with its own weighing system enabling the truck driver to know at all times the weight of the load the truck is carrying, avoiding the necessity to drive to a central weighing scale and enabling to load the truck to the rated value without any overloading.

Another object of the present invention resides in the provision of a weighing system of the character described, which is very simple in construction and which can be installed on dumping trucks as well as trucks having a fixed load carrying platform or box.

Another object of the invention resides in the provision of a weighing system of the character described, which is more accurate than the conventional above-mentioned weighing scale, because only the load and the box carrying the load are weighed, as opposed to the entire truck.

The foregoing and other important objects of the present invention will become more apparent during the following disclosure and by referring to the drawings, in which:

FIGURE 1 is a side elevation, partially in longitudinal section, of a truck provided with the weighing system in accordance with the present invention;

FIGURE 2 is a cross-section of the truck and of the weight sensing means in accordance with the first embodiment;

FIGURE 3 is a cross-section of another embodiment of the weight sensing means;

FIGURE 4 is a cross-section of the weight indicating means; and

FIGURE 5 is a plan section of the weight indicating means.

Referring now more particularly to the drawings in which like reference characters indicate like elements throughout, reference letter T indicates a conventional truck including a cab 1, tire wheels 2 and a load carrying box or platform 3. The truck T further includes a chassis or frame providing longitudinally extending chassis beams 4 arranged in spaced parallel relationship and having preferably a channel-shaped cross-section.

Box or platform 3 is also provided with longitudinally extending chassis beams 4 arranged in spaced parallel relationship and having preferably a channel-shaped cross-section.

Box or platform 3 is also provided with longitudinally extending beams 5, also of channel-shaped cross-section, and rigidly secured underneath the box 3.

Beams 5 are arranged in spaced parallel relationship and each beam is disposed above a chassis beam 4. Box beam 5 removably fits within angle irons 6.

Angle irons 6 extend longitudinally substantially the entire length of the chassis beams 4 behind cab 1 and are pivotally connected at 7 at their back end to the box beams 5, whereby the box 3 is of the dumping type.

Load sensing devices 8 are disposed longitudinally of angle irons 6 and chassis beams 4 between these elements. For instance, there might be three load sensing devices 8 on each side of the truck. In the case where the box 3 is fixed and is not of the dumping type, angle irons 6 may be dispensed with and the load sensing devices 8 disposed directly between the box beams 5 and the chassis beams 4.

Reference is had to a box 3 of the dumping type and provided with angle irons 6. In this case, each load sensing device 8 comprises a bottom disc 9 directly secured on top of the chassis beam 4, and a top disc 10 directly secured underneath the angle iron 6. The two discs 9 and 10 are interconnected by a flexible diaphragm 11, forming an annulus of semi-circular cross-section and of circular shape when seen in top plan view.

Diaphragm 11 has its edges secured in fluid-tight contact with the opposite faces of the discs 9 and 10. Top disc 10 has a fluid passage 12 connecting the inside of the diaphragm with a line 13 running longitudinally of the truck and connected to a load indicating device 14.

Each load sensing device 8 is provided with its individual line 13. Each individual line 13 is connected to a chamber 15 at the load indicating device 14, said chamber being closed by a diaphragm 16 on which rests a piston 17, the piston rod of which abuts against the underside of a lever plate 18.

The latter is of generally triangular shape and its base edge is provided on the top of the lever plate with a groove parallel to the base edge and receiving a knife edge 19 which is secured to a box 20 housing the load indicating device.

The cavity defined by diaphragm 11, together with line 13 and chamber 16, is filled with oil and similar liquid and the pressure exerted by the box 3 and its load on the liquid within diaphragm 11, is transmitted to the diaphragm 16 of chamber 15 and consequently the associated piston 17 exerts an upward force on lever plate 18.

The lever plate totalizes all the upward forces of the respective load sensing devices 8. The pistons 17 are disposed in rows parallel to the knife edge 19. They may be disposed in several rows and the rows further away from the knife edge have diaphragms 15 of smaller diameter than the rows closer to the knife edge in proportion to the lever arms along the lever plate 18 of the pistons 17.

The apex of the lever plate 18 supports a chamber 21 closed by a diaphragm 22, on which rests a piston 23 abutting against the top wall of box 20. The chamber 21 is in communication with a fluid line 24 connected to a manometer 24, preferably calibrated in weight units.

The sum of the upward forces exerted by the load sensing device 8 exerts a corresponding compression force on the diaphragm 22 of chamber 21 and this force indicates the weight of the load on manometer 25. The latter may be calibrated directly to read the weight of the load apart from the weight of the load carrying box 3 itself.

FIGURE 3 shows another embodiment of the load sensing device indicated at 8'. This device 8' comprises a bottom disc 9' secured on top of the chassis beam 4, and a top disc 10' secured underneath the angle irons 6 with the interposition of a diaphragm 11, which is in the form of a disc secured at its periphery to the bottom disc 9' in fluid-tight manner and which is provided with an annular rib 26 surrounding the top disc 10', the latter being secured to the diaphragm within the rib 26. Bottom disc 9' is provided with a nipple 27 for connecting to a fluid line 13.

The box structure 3 must be stabilized against horizontal movement with respect to the chassis beams 4, while being free to move vertically in order to obtain an accurate weight reading.

Pairs of transversely extending stabilizing rods 28 and 29 are spaced longitudinally of the truck. The rods 28 and 29 of each pair are crossed and in parallel relationship. One end of rod 28 is pivotally connected to an ear 30 secured to the chassis beam 4 on the left hand side of the truck, while the opposite end of rod 28 is pivotally connected to an arm 31 to top disc 10 or to the angle irons 6 on the right hand side of the truck.

Similarly, rod 29 is pivotally connected at its ends to an ear 30 secured to chassis beam 4 on the right hand side of the truck and to an arm 31 secured to the top disc 10 or to the angle irons 6 on the left hand side of the truck. Thus, adjacent ends of rods 28 and 29 on one or the other side of the truck are connected to the chassis beam and to the angle iron 6 or top disc 10 respectively. Similarly, longitudinally extending pairs of rods 32 and 33 are associated with each side of the truck.

Rod 32 is pivotally connected at one end to an arm 34, rigidly secured to the chassis frame 4 near the front thereof and at the other end to an arm 35, rigidly secured to the top disc 10 or to the angle iron 6 near the back angle iron 6. Similarly, rod 33 is pivotally connected at its ends to arms 36 and 37, rigidly secured to beam 4 near the back thereof and to frontmost top disc 10 and such that the pivotal connections of rods 32 and 33 are reversed. Thus, stabilizer rods 32, 33 are crossed and positively prevent longitudinal movement of the box 3 with respect to the chassis beams 4, while allowing free upward and downward movement.

When the weighing system is not used, wedges, not shown, may be inserted between the angle irons 6 and the chassis beams 4 to relief pressure on the diaphragms of the load sensing devices 8 or 8'.

The system of the invention can also be mounted on other load carrying devices than trucks, such as platforms used for loading ships or carriers for transporting baggage in railway stations and the like.

In the annexed claims, the term "truck" includes these devices.

While preferred embodiments in accordance with the invention have been illustrated and described, it is understood that various modifications may be resorted to without departing from the scope of the appended claims.

What I claim is:

1. In a truck having a chassis and a load-carrying box, a system for giving indication of the weight of the load carried in the box, said weighing system comprising load sensing devices disposed between the chassis and the box and supporting the latter, load totalizing and indicating means connected to said load sensing devices, and means for preventing relative lateral movement of said box with respect to said chassis, while allowing free vertical relative movement between said box and said chassis, said last-named means comprising spaced pairs of transversely extending crossed rods arranged in spaced substantially parallel relationship, one end of one rod of each pair pivotally connected to the chassis and the other end of the same rod of each pair pivotally connected to the load carrying box, opposite ends of the other rod of each pair being pivotally connected to the load carrying box structure and to the chassis respectively.

2. In a truck as claimed in claim 1, further including pairs of longitudinally extending stabilizing rods, also pivotally connected in alternate fashion to the load carrying box structure and to the chassis beams on each side of the truck.

3. In a truck as claimed in claim 1, wherein each load sensing device comprises spaced parallel top and bottom discs and a flexible diaphragm interposed between said discs, said diaphragm being an annulus having a semi-circular cross-section and having its circular edges secured in fluid-tight manner to the opposed faces of the respective discs.

4. In a truck as claimed in claim 1, wherein each load sensing device comprises a top disc and a bottom disc and a flexible diaphragm of disc shape secured to said bottom disc at its periphery in fluid-tight manner, said diaphragm having an annular rib formed therein surrounding said top disc, the latter adhered to said diaphragm inside said rib.

5. In a truck as claimed in claim 1, wherein said load totalizing and indicating means include a frame, a knife edge secured to said frame, a lever plate fulcrumed on said knife edge near one edge, a single fluid expansible chamber disposed between said lever plate and said frame at a distance from said knife edge, a manometer in communication with said fluid expansible chamber, and a plurality of fluid expansible chambers disposed between said frame and the face of said lever plate opposite said first-named load expansible chamber and between the latter and said knife edge, said plurality of fluid expansible chambers being individually connected to the load sensing devices.

6. In a truck as claimed in claim 5, wherein said fluid expansible chambers are disposed in rows parallel to said knife edge and having a fluid pressure exposed area of a size inversely proportional to their distance from said knife edge along lines parallel to the line defining the distance from said knife edge of said first-named fluid expansible chamber.

References Cited by the Examiner

UNITED STATES PATENTS

| | | | |
|---|---|---|---|
| 601,339 | 3/1898 | Freeman | 177—209 |
| 2,093,141 | 9/1937 | Sonsalla | 177—209 |
| 2,596,032 | 5/1952 | Keef | 177—209 X |
| 2,684,594 | 7/1954 | Furcini | 177—209 X |

FOREIGN PATENTS 496,896  8/1954  Italy.

RICHARD B. WILKINSON, *Primary Examiner.*

R. S. WARD, *Assistant Examiner.*